(12) United States Patent
Yoshikawa

(10) Patent No.: US 6,298,372 B1
(45) Date of Patent: Oct. 2, 2001

(54) COMMUNICATION TERMINAL APPARATUS AND COMMUNICATION CONTROL METHOD FOR CONTROLLING COMMUNICATION CHANNELS

(75) Inventor: Munehiro Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/181,382

(22) Filed: Oct. 28, 1998

(30) Foreign Application Priority Data

Oct. 31, 1997 (JP) .................................................. 9-301336

(51) Int. Cl.[7] ...................................................... G06F 15/16
(52) U.S. Cl. ......................... 709/200; 709/203; 709/206; 709/227; 709/228; 455/419; 455/420; 370/252
(58) Field of Search ........................... 709/200, 202–203, 709/206, 227–228, 238, 249–250; 455/412–420, 445, 461–463, 466; 370/252

(56) References Cited

U.S. PATENT DOCUMENTS

| | | | |
|---|---|---|---|
| 5,473,143 | * 12/1995 | Vak et al. .............................. | 235/280 |
| 5,542,047 | * 7/1996 | Armstrong ............................ | 709/224 |
| 5,612,992 | * 3/1997 | Dupuy et al. ......................... | 455/466 |
| 5,659,596 | * 8/1997 | Dunn .................................... | 455/456 |
| 5,675,507 | * 10/1997 | Bobo, II ............................... | 709/206 |
| 5,742,905 | * 4/1998 | Pepe et al. ............................ | 455/461 |
| 6,052,737 | * 4/2000 | Bitton et al. .......................... | 709/248 |
| 6,061,502 | * 5/2000 | Ho et al. ............................... | 358/402 |
| 6,209,035 | * 3/2001 | Terakita ................................ | 709/227 |
| 6,215,774 | * 4/2001 | Knauerhase et al. ................ | 709/203 |

* cited by examiner

*Primary Examiner*—Bharat Barot
(74) *Attorney, Agent, or Firm*—Frommer Lawrence & Haug LLP.; William S. Frommer; Gordon Kessler

(57) ABSTRACT

The present invention is intended to control communication devices on a screen with a good operability. The present invention provides a communication terminal apparatus which comprises receiving means for receiving from a server a text file created on the basis of communication control information, wherein the communication control information includes a specifying word for specifying a desired communication device and transmission control information for controlling transmission origination processing for the communication device, display means for detecting the communication control information in the text data to display a communication device corresponded to the specifying word and its line number on a screen, and control means operative when a displayed portion of the communication device and its line number is selected to perform the transmission origination processing for the line number to establish a communication link when a transmission origination condition defined by the transmission control information is satisfied, and to get rid of the transmission origination processing when the transmission origination condition is not satisfied.

14 Claims, 14 Drawing Sheets

| COMMUNICATION CONTROL | SPECIFYING WORD | ASSOCIATED INFORMATION OF SPECIFYING WORD | USER NOTIFICATION INFORMATION | TRANSMISSION CONTROL INFORMATION | PRIORITY PROCESSING INFORMATION |
|---|---|---|---|---|---|
| Telephone | telephoneto: PHONE: Tel: Telephone: | OMISSION OF [:] ALSO INCLUDED IN SPECIFYING WORD. IGNORE SPACE AFTER SPECIFYING WORD. UPPER CASE AND LOWER CASE NOT DISTINGUISHED | Color=red font=bold <,>DIPLAY OFF ADD ICONS ADD MENU | IDENTIFY from, to IDENTIFY through, to | IDENTIFY others |
| Fax | faxto: FAX: Facsimilie: | OMISSION OF [:] ALSO INCLUDED IN SPECIFYING WORD. IGNORE SPACE AFTER SPECIFYING WORD. UPPER CASE AND LOWER CASE NOT DISTINGUISHED | Color=red font=bold ADD ICONS ADD MENU | IDENTIFY from, to IDENTIFY through, to | |
| Internet Telephone | Internet telephoneto: | SAME AS ABOVE | SAME AS ABOVE | SAME AS ABOVE | IDENTIFY others |
| Internet Fax | Internetfaxto: | SAME AS ABOVE | SAME AS ABOVE | SAME AS ABOVE | |
| Pager | Pagerto: | SAME AS ABOVE | SAME AS ABOVE | | |
| Internet Voicemail | Internetvoice mailto: | SAME AS ABOVE | SAME AS ABOVE | | |

FIG. 3

```
<HTML>
<HEAD>
<TITLE>Contact</TITLE>
</HEAD>
<BODY>

THIS IS TARO SONY. <BR>
CONTACT ME AT <BR>

<UL>
<A HREF="telephoneto:00-1234-5678"><B>Tel:00-1234-5678</B></A><BR>
<A HREF="faxto:00-1234-1234"><B>FAX:00-1234-1234</B></A><BR>
</UL>

</BODY>
</HTML>
```

FIG. 4

THIS IS TARO SONY.
CONTACT ME AT
    Tel:00-1234-5678
    FAX:00-1234-1234

FIG. 5

```
<HTML>
<HEAD>
<TITLE>Contact</TITLE>
</HEAD>
<BODY>

THIS IS TARO SONY.
CONTACT ME AT:

<UL>
<A HREF="internettelephoneto:01.23.45.67"><B>INTERNET TELEPHONE:
(01.23.45.67)</B></A><BR>

<A HREF="internetfaxto:01.23.45.67"><B>INTERNET FAX:
(01.23.45.67)</B></A><BR>

<A HREF="internetvoicemailto:
taro@sony.co.jp"><B>INTERNET VOICE MAIL:
taro@sony.co.jp</B></A><BR>
</UL>

</BODY>
</HTML>
```

FIG. 7

THIS IS TARO SONY.
CONTACT ME AT
    INTERNET TELEPHONE:(01.23.45.67)
    INTERNET FAX:(01.23.45.67)
    INTERNET VOICE MAIL:taro@sony.co.jp

FIG. 8

```
<HTML>
<HEAD>
<TITLE>Contact</TITLE>
</HEAD>
<BODY>

THIS IS TARO SONY. <BR>
CONTACT ME AT <BR>

<UL>
<A HREF=from 8:00 to 17:00+0900(JST)through
Monday to Friday "telephoneto:00-1234-5678">
<B>Tel:00-1234-5678</B></A><BR>
</UL>

</BODY>
</HTML>
```

FIG. 10

```
        THIS IS TARO SONY.
        CONTACT ME AT
              Tel:00-1234-5678
```

FIG. 11

```
<HTML>
<HEAD>
<TITLE>Contact</TITLE>
</HEAD>
<BODY>

THIS IS TARO SONY. <BR>
CONTACT ME AT <BR>

<UL>
<A HREF=from 8:00 to 17:00+0900(JST)through
Monday to Friday "telephoneto:00-1234-5678",others"faxto:00-1234-1234">
<B>INQUIRIES BY TELEPHONE(8:00~17:00)(00-1234-5678)</B></A><BR>
AND<A HREF="faxto:00-1234-1234"><B>
F A X(00-1234-1234)OUT OF SERVICE HOURS</B></A><BR>
</UL>
```

FIG. 12

THIS IS TARO SONY.
CONTACT ME AT
   INQUIRIES BY TELEPHONE(8:00~17:00)(00-1234-5678)
FAX(00-1234-1234)OUT OF SERVICE HOURS

FIG. 13

THIS IS TARO SONY.
CONTACT ME AT
    Tel:00-1234-5678
    FAX:00-1234-1234

51 — [TEL]

52 — [FAX]

FIG. 15

COMMUNICATION TERMINAL APPARATUS AND COMMUNICATION CONTROL METHOD FOR CONTROLLING COMMUNICATION CHANNELS

BACKGROUND OF THE INVENTION

1. Field of the Invention

This invention relates to a communication terminal apparatus and a communication control method, and more particularly, is suitable for application in World Wide Web (WWW) constructed in the Internet.

2. Description of the Related Art

In recent years, the Internet has been developed as a global computer network. The Internet is a world-wide network in which computer networks existing in enterprises, universities, and so on in respective countries are connected to each other through wide area lines. A user is allowed to receive a variety of provided Internet services through a computer apparatus. There are a wide variety of existing services including, for example, "electronic mail" for transmitting a message to a particular recipient; "remote computer access" for utilizing a remote computer apparatus; "File Transfer Protocol (FTP)" for transferring resources and receiving provided information; "net news" for providing information on and discussing a variety of themes; "WWW" for providing multimedia information of a hyper link structure in which pages are mutually linked; and so on.

Particularly, in WWW, data is transferred in accordance with a communication connection procedure (hereinafter, this is referred to as "protocol") named Hyper Text Transfer Protocol (HTTP), a home page and so on are displayed on a screen through files written by Hyper Text Markup Language (HTML), such that information can be searched and displayed readily on the screen.

The user may use a WWW browser to access a WWW server and receive provided information and services, while information providers provide information and services to the WWW browser using a WWW server.

When the user uses a WWW browser to acquire hyper-linked information, the user first specifies the location of a home page (Uniform Resource Locator (URL)) to be connected, causing a client computer apparatus to request the WWW server having the URL to transfer information. The WWW server, upon receiving the request, transfer an HTML file of the specified home page to the client computer apparatus.

The client computer apparatus analyzes the HTML file to display displayable portions on a display, and issues another transfer request if the HTML file contains other data (for example, image information) embedded therein. Also, when certain information, displayed by the client computer apparatus, includes related information provided therefor, the information is displayed in a different color or is underscored. On the HTML file, URL indicative of the location of the related information is embedded.

When the user clicks on a different color portion (or an underscored portion), the client computer apparatus issues a transfer request to a WWW server that has the information, so that the WWW server, receiving the transfer request, transfers an HTML file of a specified new page. In this way, linked file information is sequentially provided as the user repeats clicking manipulations in a sequential manner.

The HTML file is intended to describe the structure of a text, and includes the actual contents of the text and a tag (attribute information). A tag is represented by a portion enclosed in between "<" and ">", and is used to represent, for example, an element of a text, a structure, a shaping method, a linked destination, and so on. Actually, an <HTML> tag is used to represent that a text file is described by an HTML file, and an <A> tag is used to represent a linked destination.

Also, in WWW, a file (home page) residing on the Internet is specified through URL, wherein the URL used in this event is made up of a scheme (data structure) name, a domain name (host name), and a file name for specifying a transfer protocol name, a WWW server, and a file name, respectively. For example, when URL is sony.co.jp/, the scheme name, the domain name, and the file name are http, www.sony.co.jp, and /sonydrive/index.html, respectively.

While an access to an actual WWW server is accomplished with an Internet Protocol (IP) address, the IP address is recognized from the domain name. Specifically, there is Domain Name Server (DNS) as a server for acquiring an IP address from a domain name, such that a WWW browser queries the DNS to recognize an IP address.

Also, a linked destination is represented by a <A> tag in an HTML file constituting a home page, such that the user can readily acquire other related home pages from a certain home page. For example, when "<A HREF=" sony.co.jp/ ">Go back to Main Menu </A>" is described in a certain HTML file, a WWW browser displays "Go back to Main Menu" on the screen.

Here, HREF="sony.co.jp/" within the <A> tag in this HTML file represents that the URL of a linked destination is "sony.co.jp/". Also, in the HTML file, a </A> tag is an end tag of the <A> tag, and a text between the <A> tag and the </A> tag (here, "Go back to Main Menu") is displayed with highlight (most brightly) or with an underscore in order to indicate that a link is held there.

When the user clicks on a displayed portion "Go back to Main Menu" displayed by the WWW browser on the screen, the client computer apparatus requests a WWW server for a linked destination described in the <A> tag or an HTML file represented by the URL "sony.co.jp/". The WWW server searches for the HTML file that has been assigned the domain name in this URL, and transmits the HTML file to the WWW browser. The WWW browser receives the HTML file transmitted thereto from the WWW server, and analyzes the contents of the HTML file to display the same on the screen.

When a linked destination is corresponded to a predetermined portion within a home page displayed in the foregoing manner using an <A> tag (hyper link structure), corresponding home pages can be sequentially provided by clicking on the predetermined displayed portion in a manner similar to the above-mentioned case.

When the user attempts to transmit some opinion, impression, or the like to creators of a home page as an electronic mail after viewing the home page displayed on the screen of the client computer apparatus, the user may click on an anchor (an entrance to another text) provided in a lower portion of the home page to start electronic mail software which automatically displays a mail input screen for transmission, so that the user can readily input a message to the creator for transmission.

Home pages displayed by information providers such as enterprises often present only outlines, with a telephone number or a facsimile number additionally displayed for users who want to know more detailed contents so that inquiries from the users are accepted. Currently, however, when a home page creator describes a linked destination in an HTML file with URL, the linked destination can be described or specified only with a transfer protocol such as http, ftp, or the like, so that it is not possible to describe as a linked destination a communication device such as a telephone, a facsimile (hereinafter referred to as the "FAX") apparatus, or the like which can be communicated with a particular protocol.

For this reason, the user, who has opened a home page, must once confirm a telephone number or a FAX number of a reference displayed on the home page on the screen and then take the trouble to place a call or transmit FAX information. In addition to such a troublesome procedure to be taken, the user may call a wrong line number, thus suffering from a poor operability.

Also, when the user places a call to a reference out of a range of business hours, nobody will respond to the call while ringer sound of the telephone is generated so many times, resulting in making the user annoyed.

Also, in the client computer apparatus, an anchor placed in a lower portion of a home page must be clicked in order to transmit a message to the creator of a home page, so that the location of the displayed anchor must be found while scrolling the screen, thus presenting a problem that time and labor are required.

SUMMARY OF THE INVENTION

In view of the foregoing, an object of this invention is to provide a communication terminal apparatus and a communication control method which are capable of controlling a communication device with a good operability.

The foregoing object and other objects of the invention have been achieved by the provision of a communication terminal apparatus comprising: receiving means for receiving communication control information including a specifying word for specifying a desired communication device and transmission control information for controlling transmission origination processing for the communication device; and control means operative when the specifying word is selected by operation from an user to perform the transmission origination processing to establish a communication link when a transmission origination condition defined by the transmission control information is satisfied, and to get rid of the transmission origination processing when the transmission origination condition is not satisfied.

Further, the object of this invention has been achieved by a provision of a communication control method comprising: a transmitting step of transmitting communication control information including a specifying word for specifying a desired communication device and transmission control information for controlling transmission origination processing for the communication device; a receiving step of receiving the communication control information at a client; a displaying step of detecting the communication control information to display a character or diagram corresponded to the specifying word on a screen; and a controlling step, executed when the character or diagram is selected, of performing the transmission origination processing to establish a communication link when a transmission origination condition defined by the transmission control information is satisfied, and getting rid of the transmission origination processing when the transmission origination condition is not satisfied.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is a schematic diagram illustrating an example of information stored in memory;

FIG. 4 is text data showing a source display of an HTML file;

FIG. 5 is a schematic diagram illustrating a home page displayed by a browser;

FIG. 7 is text data showing a source display of an HTML file for establishing a communication link through the Internet;

FIG. 8 is a schematic diagram illustrating a home page displayed by a browser for establishing a communication link through the Internet;

FIG. 10 is text data showing a source display of an HTML file for limiting a communication control time;

FIG. 11 is a schematic diagram illustrating a home page displayed by a browser for limiting a communication control time;

FIG. 12 is text data showing a source display of an HTML file for performing a communication control with priority;

FIG. 13 is a schematic diagram illustrating a home page displayed by a browser for performing a communication control with priority;

FIG. 15 is a schematic diagram illustrating a display of a home page by a browser using dedicated icons;

DETAILED DESCRIPTION OF THE EMBODIMENT

Preferred embodiments of this invention will be described with reference to the accompanying drawings:

(1) General Configuration

Figure 1:
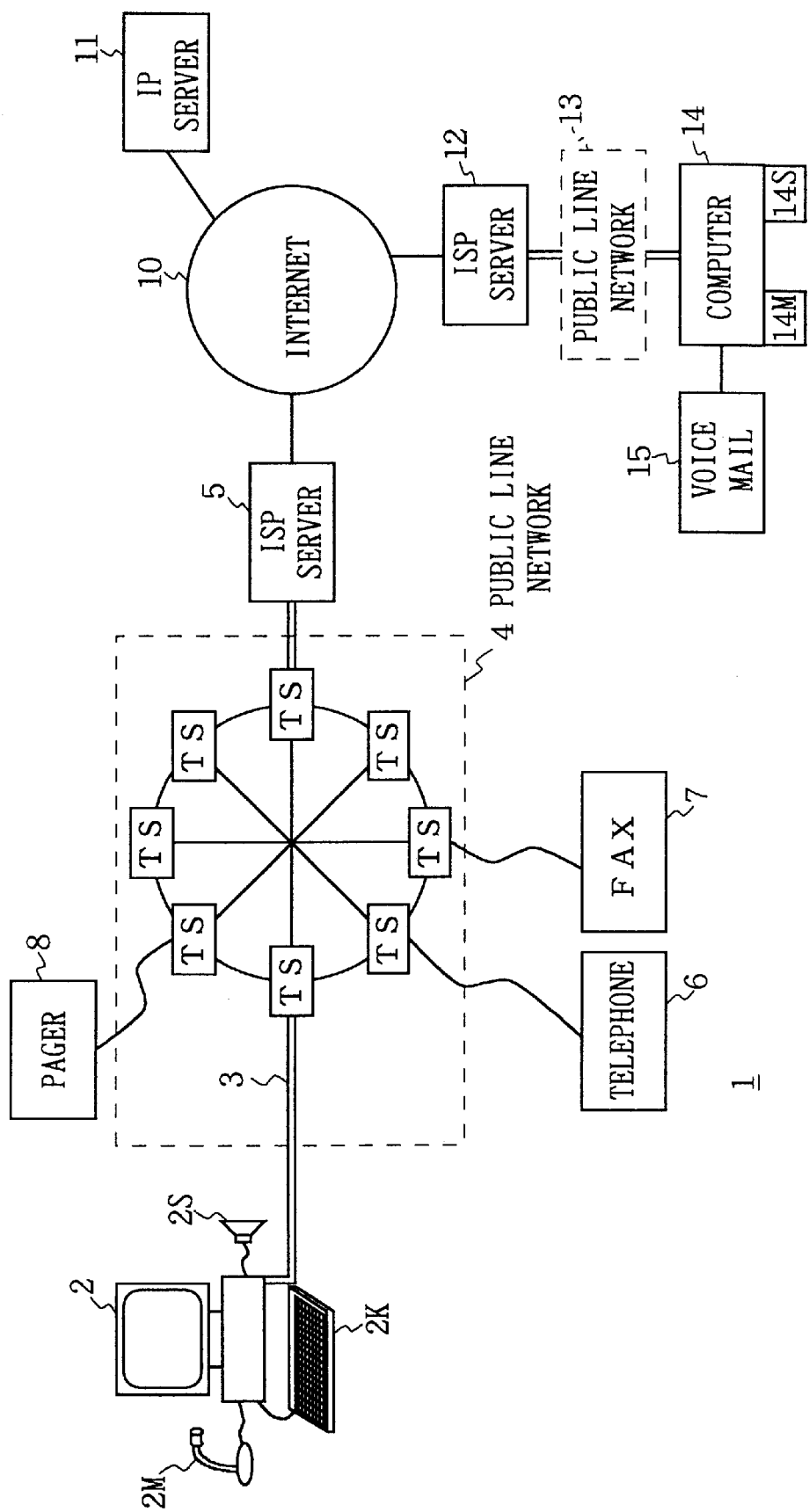
FIG. 1 is a block diagram illustrating the configuration of a system network according to one embodiment of the present invention.

As illustrated in FIG. 1, a network system is generally designated by 1, and the user has a client computer apparatus 2 which is connected to an Internet Service Provider (ISP) server 5 possessed by a service provider through a public line network 4 connected thereto via an Integrated Service Digital Network (ISDN) line 3.

The client computer apparatus 2 is also connected to a telephone 6, a FAX apparatus 7, and a pager 8 through a plurality of switchers (TS) of the public line network 4.

The ISP server 5 is connected to the Internet 10, and an Information Provider (IP) server 11 as a WWW server possessed by an information provider is connected to the Internet 10. Also, the Internet 10 is connected to another computer apparatus 14 through another ISP server 12 and the public line network 13, such that a communication link can be established between the client computer apparatus 2 and the computer apparatus 14 via Internet telephone and Internet FAX through the Internet 10.

The computer apparatus 14 is also connected to a voice mail unit 15 for holding and providing a voice message, so that a communication link by an Internet voice mail through the Internet 10 can be established between the computer apparatus 14 and the client computer apparatus 2. Note that in the Internet 10, communications are made mutually between computers in accordance with a protocol referred to as "Transmission Control Protocol/Internet Protocol (TCP/IP)".

With the WWW constructed on the Internet 10 in the manner described above, each user may access the IP server 11 using a WWW browser as an application of the client computer apparatus 2 to receive a variety of information and services such as a home page provided thereby. Also, the information provider is adapted to provide a variety of information and services such as a home page to the WWW browser (client computer apparatus 2) using the IP server 11 which functions as a WWW server.

For reference, while the client computer apparatus 2 may be directly connected to the Internet 10, the user normally makes a contract with a service provider such that the client computer apparatus 2 is connected to the Internet 10 by accessing the ISP server 5 through the public line network 4.

In the network system 1 as described above, the user can access the ISP server 5 through the public line network 4 by manipulating the client computer apparatus 2, thereby establishing a communication link between the client computer apparatus 2 and the ISP server 5.

When the user inputs the address (URL) of a desired home page from the client computer apparatus 2 to request the IP server 11 for the home page in a communication link established state as mentioned above, the IP server 11 transmits the home page of the specified address to the ISP server 5 through the Internet 10.

The ISP server 5, upon receiving the home page transmitted from the IP server 11, transfers the home page to the client computer apparatus 2 through the public line network 4. In this way, the client computer apparatus 2, upon receiving the desired home page in a text data format of an HTML file, analyzes the HTML file to display the home page on the screen.

Here, an HTML file stored in the IP server 11 has line numbers of communication devices described with a <A> tag together with specifying words, later described, so as to extend the link to the telephone 6, the FAX apparatus 7, the pager 8, and the other computer apparatus 14, other than URL of information (file) on a linked destination.

Stated another way, in the network system 1 of the present invention, a tag is extended in an HTML to newly define a specifying word for specifying a communication device as a linked destination, so that a line number can be described as a linked destination corresponding to a predetermined character string or image.

The specifying word is implemented under the condition that it is defined at least between the IP server 11 on the transmission side and the client computer apparatus 2 on the reception side. A home page stored in the IP server 11 has already been formed with such specifying words.

In this event, the client computer apparatus 2 needs to use corresponding communication procedures for communicating respectively with the telephone 6, the FAX apparatus 7, the pager 8, and the other computer apparatus 14 which can only communicate with a communication protocol other than http.

Similarly to a transfer protocol included in URL which is described together with an <A> tag, additional information representative of communication procedures is included in line numbers described together with a specifying word, respectively for communicating with the telephone 6, the FAX apparatus 7, the pager 8, and the computer apparatus 14. This enables the client computer apparatus 2 to establish a communication link with any of these communication devices based on the line number and the added communication procedure.

Therefore, by registering the client computer apparatus 2 with the same specifying word as that registered previously by the user in the IP server 11 on the transmission side, the specifying word can be detected from an HTML file, so that when the specifying word is detected, a line number of a communication device corresponding to the specifying word is detected to establish a communication link in accordance with a predetermined communication procedure.

This enables the client computer apparatus 2 to not only start electronic mail software for transmitting an electronic mail to a creator of a home page but also readily control communications with the telephone 6, the FAX apparatus 7, the pager 8, and the computer apparatus 14 only by the user clicking on a predetermined displayed portion (for example, a displayed portion of a communication device corresponding to a specifying word and its line number) on the home page.

Actually, the client computer apparatus 2 analyzes an HTML file extended with a newly defined specifying word to display a home page on the screen. When the user clicks on a displayed portion of a communication device corresponding to a specifying word and its line number, the client computer apparatus 2 transmits the line number to establish a communication link with the communication device in accordance with a predetermined communication procedure. Consequently, the user can communicate information with the telephone 6, the FAX apparatus 7, the pager 8, and the computer apparatus 14 through the client computer apparatus 2.

In this way, the user may only be required to click on a displayed portion of a communication device and its line number on the screen of the client computer apparatus 2 to place a call to the telephone 6, or utilize the Internet telephone through the Internet 10. In this event, the user may communicate with the telephone 6 of the destination using a microphone 2M and a speaker 2S of the client computer apparatus 2 or communicate with a called party through a microphone 14M and a speaker 14S of the computer apparatus 14.

Also, the user may only be required to click on a displayed portion of a communication device and a line number thereof on the screen of the client computer apparatus 2 to transmit FAX information to the FAX apparatus 7 or to transmit FAX information by the aid of the Internet FAX through the Internet 10. In this event, the user may input and transmit FAX information using a keyboard 2K of the client computer apparatus 2.

Similarly, the user may only be required to click on a displayed portion of a communication device and its line number on the screen of the client computer apparatus 2 to transmit a message to the pager 8, or transmit a voice message to a voice mail apparatus 15 connected to the other computer apparatus 14. Also in this event, the user may input and transmit a message using the keyboard 2K of the client computer apparatus 2 or transmit a voice mail using the microphone 2M.

(2) Configuration of Client Computer Apparatus

Figure 2:
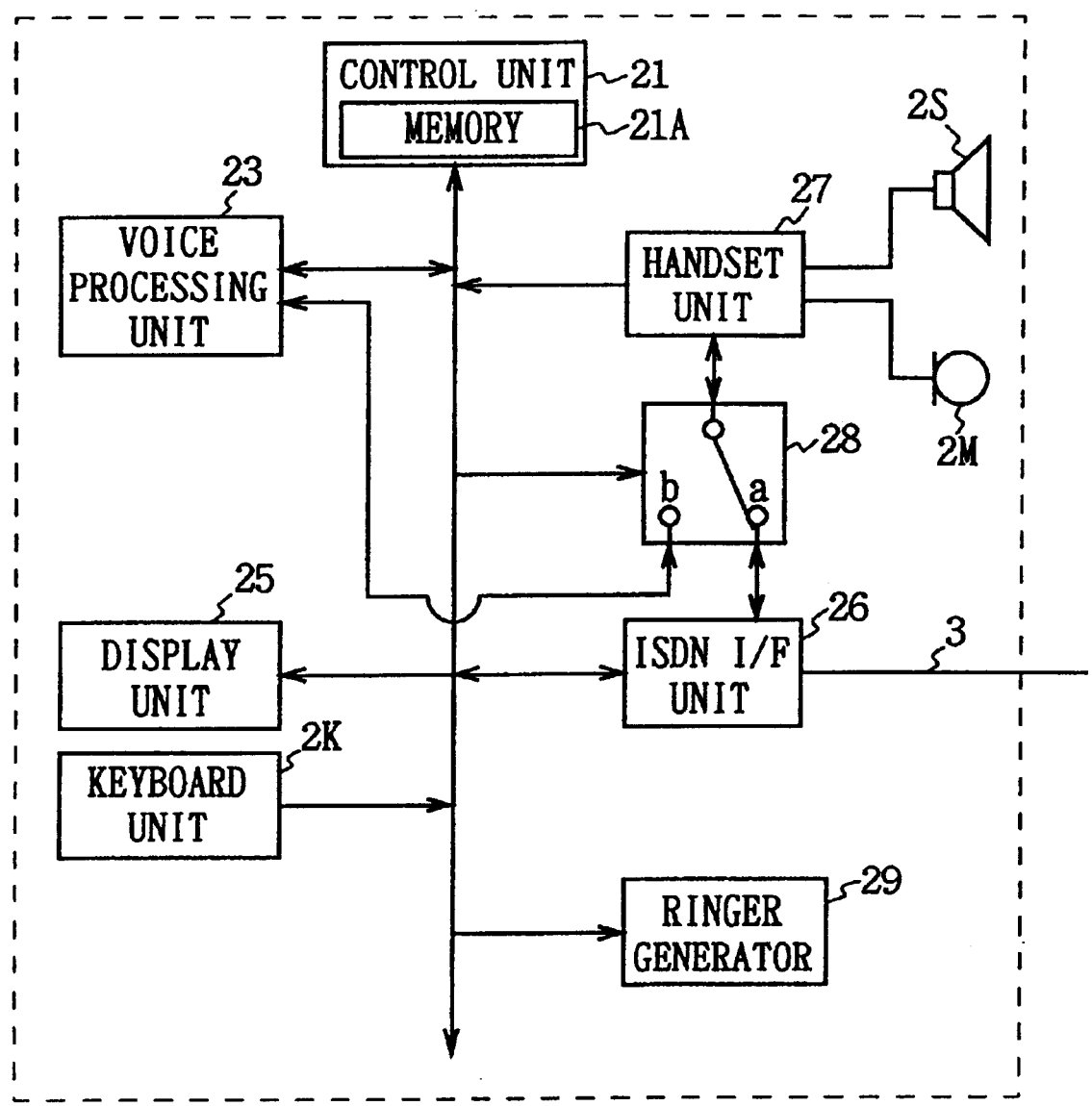
FIG. 2 is a block diagram illustrating the configuration of a client computer apparatus.

As illustrated in FIG. 2, the client computer apparatus 2, serving as a communication terminal apparatus of the present invention, may be connected to the telephone 6, the FAX apparatus 7, and the pager 8 (FIG. 1) from an ISDN interface unit 26 through the public line network 4 as well as may establish a communication link by the Internet telephone, Internet FAX, and Internet voice mail with the other computer apparatus 14 (FIG. 1) from the ISDN interface unit 26 through the public line network 4, the ISP server 5, and the Internet 10.

A control unit 21, which is responsible for controlling the entire terminal, executes required data processing such as protocol processing for data transmitted thereto through the Internet 10, processing for generating data to be transmitted through the Internet 10, and so on.

A voice processing unit 23 compresses voice data to be transmitted and decompresses received voice data since voice data is compressed in packets for transmission in telephone communications through the Internet.

The keyboard unit 2K comprises a dial key and other key switches such that the user instructs the terminal through the control unit 21 to execute transmission origination processing and control corresponding thereto by manipulating predetermined key switches, in addition to inputting FAX information through key manipulations and creating a message to be transmitted to a pager.

A display unit 25 displays a home page on the screen based on an HTML file, and displays communication devices and their line numbers on the home page as candidates subjected to communication control which may be selected by the user.

The ISDN interface unit 26 is connected to the ISDN line 3 which generally has 2B+D channels (two B-channels (for information) and a D-channel (for control signals)) in a time-division multiplexed form to provide a total of three channels of communications. Specifically, the client computer apparatus 2 can be connected to lines directed to the telephone 6, the FAX apparatus 7, and so on while the user maintains a home page opened.

A handset unit 27 digital-to-analog converts digital voice data derived from a switch circuit 28 to an analog voice signal which is then outputted to the speaker 2S, and analog-to-digital converts a voice signal inputted from the microphone 2M to a digital voice signal which is then outputted to the switch circuit 28.

The switch circuit 28, which is controlled by the control unit 21, is switched to a terminal a when a normal ISDN telephone is used, and to a terminal b when the Internet telephone is used through the Internet. A ringer generator 29 generates ringer sound to notify the user of an incoming call.

The client computer apparatus 2 analyzes an HTML file received through the ISDN interface unit 26 by the control unit 21 to display a home page on the screen of the display unit 25.

When the client computer apparatus 2 operates as a normal ISDN telephone terminal, the switch circuit 28 is switched to the terminal a to supply digital voice data received through the ISDN interface unit 26 to the handset unit 27 through the switch circuit 28. The handset unit 27 digital-to-analog converts the digital voice signal to an analog voice signal which is outputted as a received speech through the speaker 2S.

Also, in the client computer apparatus 2, a transmission voice signal inputted from the microphone 2M is analog-to-digital converted by the handset unit 27 to digital voice data which is transmitted to the telephone 6 of the destination from the ISDN line 3 through the switch circuit 28 an the ISDN interface unit 26.

Next, when the client computer apparatus 2 operates as an Internet telephone terminal, the switch circuit 28 is switched to the terminal b so that voice data received through the Internet 10 from the ISDN line 3 by way of the ISDN interface unit 26 is subjected to the protocol processing by the control unit 21 and sent to the voice processing unit 23. The voice processing unit 23 decompresses the voice data and supplies the decompressed voice data to the handset unit 27 through the switch circuit 28. The handset unit 27 digital-to-analog converts the decompressed voice signal to analog voice data which is outputted as a received speech through the speaker 2S.

Also, in the client computer apparatus 2, a transmission voice signal inputted from the microphone 2M is analog-to-digital converted by the handset unit 27 to digital voice data which is supplied to the voice processing unit 23 through the switch circuit 28. The voice processing unit 23 compresses the digital voice data and supplies the compressed digital voice data to the control unit 21. The control unit 21 transforms the compressed digital voice data into a data sequence to be transmitted through the Internet in accordance with a telephone application protocol. The resultant data sequence is transmitted from the ISDN line 3 through the ISDN interface unit 26.

Further, in the client computer apparatus 2, when a message is transmitted to the FAX apparatus 7 and the pager 8, the switch circuit 28 is switched to the terminal a so that message data inputted from the key board unit 2K through key manipulations is converted by the handset unit 27 to digital data which is transmitted from the ISDN line 3 through the switch circuit 28 and the ISDN interface unit 26.

Further, in the client computer apparatus 2, when an Internet voice mail is transmitted to the voice mail apparatus 15 connected to the other computer apparatus 14, the switch circuit 28 is switched to the terminal b so that voice data inputted from the microphone 2M is compressed by the voice processing unit 23. The compressed digital data is transformed by the control unit 21 into a data sequence to be transmitted in accordance with a predetermined protocol. The resultant data sequence is transmitted from the ISDN line 3 through the ISDN interface unit 26.

Further, when the client computer apparatus 2 operates as an Internet FAX apparatus through the Internet, transmission data inputted from the keyboard unit 2K through key manipulations is also supplied to the control unit 21. The control unit 21 converts the transmission data into a FAX format, and also transforms the FAX formatted data into a data sequence to be transmitted through the Internet in accordance with a communication application protocol. The resultant data sequence is transmitted from the ISDN line 3 through the ISDN interface unit 26.

In addition to the configuration described above, the client computer apparatus 2 has previously registered a memory 21A provided within the control unit 21 with communication control information including a specifying word for specifying a communication device, associative information associated with the specifying words, user notification information for allowing the user to readily recognize a communication device, transmission control information for specifying an available days-of-week range and an available time range, in which a communication device can be controlled, and priority processing information for preferential processing irrespective of the transmission control information. The communication control information may be inputted by the user through key manipulations.

Therefore, while an HTML file sent thereto from the IP server 11 is being analyzed by the control unit 21, when the client computer apparatus 2 finds that the HTML file contains the communication control information previously registered in the memory 21A, the control unit 21 displays communication devices corresponding to specifying words and their line numbers in a display form specified by the user notification information (displays in red or in bold) to allow the user to readily recognize where to click. Consequently, as the user clicks on a display portion of a communication device and its line number thereof, the client computer apparatus 2 establishes a communication link with the selected communication device.

(3) Contents of Registered Communication Control Information

Next described are the contents of the communication control information, including specifying words, associative information, user notification information, transmission control information, and priority processing information, registered in the memory 21A of the control unit 21 in the client computer apparatus 2.

First, the user has previously registered the memory 21A of the control unit 21 in the client computer apparatus 2, through key manipulations, with respective specifying words, associative information, user notification information, transmission control information, and priority processing information, corresponding to communication devices which may be controlled for communication.

As an example of information stored in the memory illustrated in FIG. 3, "telephoneto:, PHONE:, Tel:, or Telephone:" is registered as a specifying word for controlling a communication with the telephone 6. Then, associative information is additionally registered to note that the specifying word should be determined completely irrespective of whether ":" is omitted, whether the specifying word is followed by a space, and whether the specifying word is written in upper case or in lower case.

The user notification information, to be notified to the user, has been registered that characters are displayed in red, used fonts are bold, and a menu window and a dedicated icon are added. As the transmission control information, "from, to" and "through, to" have been registered so that the transmission origination processing is executed when the user clicks within an available days-of-week range described with "through, to" and within an available hour range described with "from, to," and the transmission origination processing is not executed when the user clicks out of the available days-of-week range or out of the available hour range, and instead the user is provided with a display for promoting the user to click within the specified available days-of-week range and available hour range.

Further, "others" has been registered as the priority processing information, meaning that the transmission origination processing is executed by any devices subjected to transmission control described below "others" when the user clicks out of the ranges specified by the foregoing "from, to" and "through, to," for example, on a national holiday or during nation's vacation.

Likewise, for the FAX apparatus 7 and the pager 8, or the Internet telephone, Internet FAX, and Internet voice mail, as candidates subjected to transmission control, similar specifying word, associative information, user notification information, transmission control information, and priority processing information have been registered as the communication control information.

(4) Communication Control for Communication Devices
(4-1) Communication Control for Telephone and FAX Apparatus As shown in FIG. 4, in a source display of an HTML file transmitted from the IP server 11, a WWW format file is defined by a start tag <HTML> and an end tag </HTML>, and the contents of the entire file are described between these tags.

Also, in the source display of the HTML file, a page header (page format information) of the HTML file is described between a start tag <HEAD> and an end tag </HEAD>, in which case a page tile "Contact" is described as a page header between a start tag <TITLE> and an end tag </TITLE>.

Between a start tag <BODY> and an end tag </BODY>, a display of a body portion, visible to the user as a home page, is described. Specifically, "This is Taro Sony. Contact me at:" is described. Further, <A HREF="telephoneto:00-1234-5678"> <B> Tel:00-1234-5678</B> </A> <BR>, and <A HREF="faxto:00-1234-1234"> <B> FAX:00-1234-1234</B> </A> <BR> are described between a start tag <UR> and an end tag </UR>.

Here, <A HREF="telephoneto:00-1234-5678"> <B> Tel:00-1234-5678</B> </A> <BR> and <A HREF="faxto:00-1234-1234"> <B> FAX:00-1234-1234</B> </A> <BR> are an extended portion of the tags, with which a telephone at telephone number 00-1234-5678 and a FAX apparatus 7 at FAX number 00-1234-1234 are linked. For reference, tags <B>, </B> indicate that characters are displayed in bold.

The client computer apparatus 2 analyzes the foregoing HTML file to display a home page on the screen as illustrated in FIG. 5. In this event, the client computer apparatus 2 displays the characters of a communication device and its telephone number (Tel:00-1234-5678 and FAX:00-1234-1234) in red and bold in accordance with the user notification information previously registered in the memory 21A, thereby allowing the user to recognize that the user may click on this portion to provide the communication control.

Consequently, when the user clicks on the displayed portion of the communication device and its telephone number (Tel:00-1234-5678) displayed in red and bold, the client computer apparatus 2 instructs the control unit 21 to execute the processing associated with the origination of a call to the telephone 6 to establish a communication link.

Specifically, when the user clicks on the displayed portion of the communication device and its telephone number (FAX:00-1234-1234) displayed in red and bold, a window is opened by the control unit 21 for inputting FAX information through key manipulations. After FAX information has been inputted, the transmission origination processing is proceeded for the FAX apparatus 7.

Although not described herein, the communication control for the pager 8 is substantially similar to the case of the FAX apparatus 7, with an extended portion of tags being replaced by <A HREF="Pagerto:03-123-4567"> <B> Pager:03-123-4567</B> </A> <BR>. When the user clicks on a displayed portion of the communication device and its telephone number (Pager:00-123-4567), a window is opened for inputting a message through key manipulations. After a message has been inputted, the transmission origination processing is proceeded for the pager 8.

Figure 6:
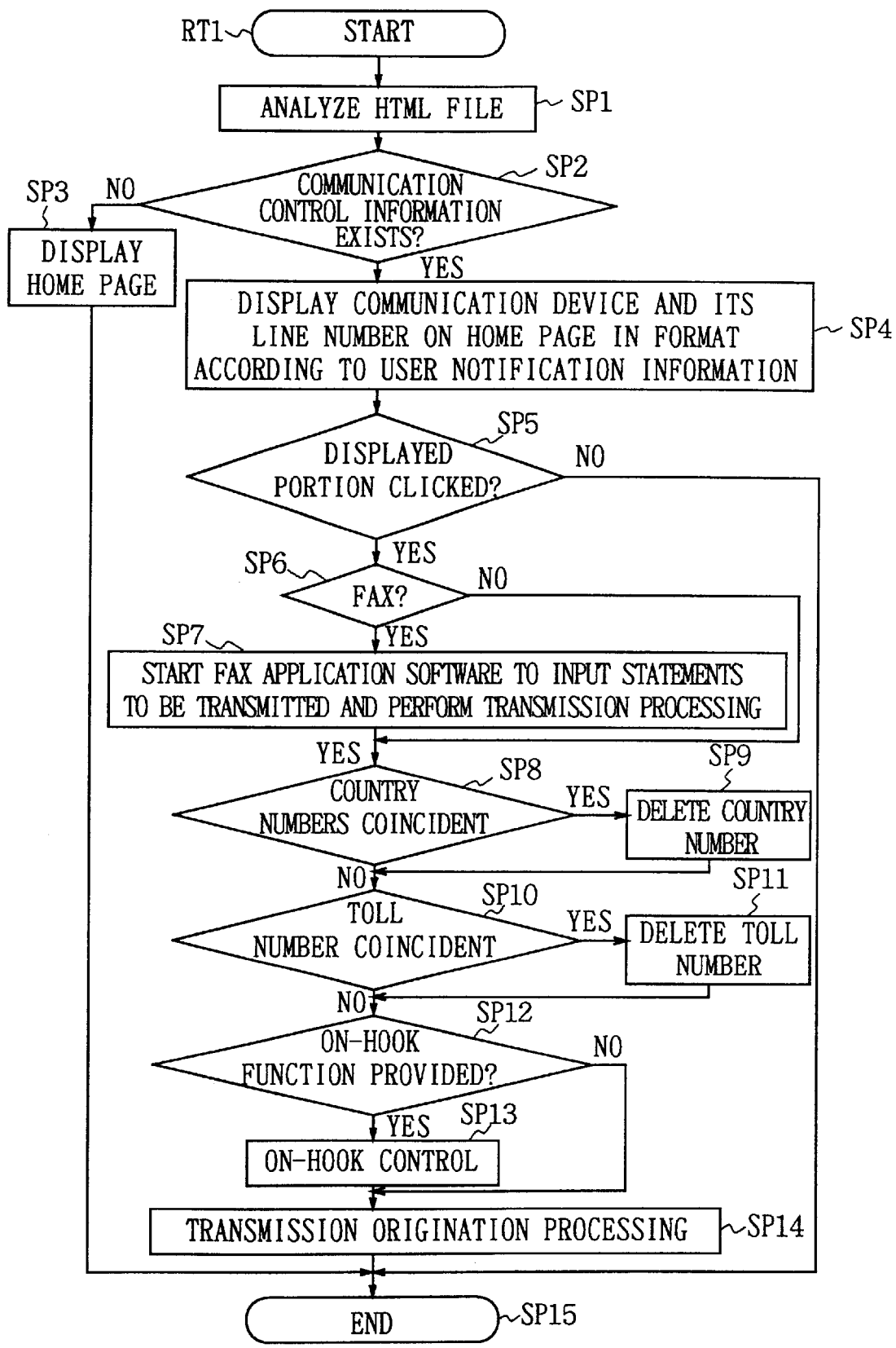
FIG. 6 is a flow chart illustrating a telephone call or FAX transmission origination processing procedure.

In the following, a processing procedure for performing the transmission origination processing for the telephone 6 or the FAX apparatus 7 by the clicking manipulation as mentioned above will be described with reference to a flow chart illustrated in FIG. 6. The client computer apparatus 2 first enters the processing procedure from a starting step RT1, and proceeds to step SP1.

At step SP1, the control unit 21 of the client computer apparatus 2 analyzes an HTML file transmitted thereto from the IP server 11, and proceeds to step SP2. At step SP2, the control unit 21 determines whether or not communication control information previously registered in the memory 21A exists in the analyzed HTML file.

If a negative result is returned here, this means that the communication control information does not exist in the HTML file, in which case the control unit 21 proceeds to step SP3. At step SP3, since no communication control information exists in the HTML file, i.e., no communication device can be controlled by clicking manipulations, the control unit 21 simply displays a home page on the screen, and proceeds to step SP15 to terminate the processing.

Contrary to this, if an affirmative result is returned at step SP2, this means that the communication control information exists in the HTML file, in which case the control unit 21 proceeds to step SP4. As step SP4, the control unit 21 displays a communication device and its telephone number on the home page in a method according to user notification information (in red and bold) based on the detected communication control information, and then proceeds to step SP5.

At step SP5, the control unit 21 determines whether or not the display portion of the communication device and its telephone number displayed in red and bold on the home page has been clicked by the user. If a negative result is returned here, this means that the displayed portion of the communication device and its telephone number has not been clicked by the user, in which case the control unit 21 determines that the user will not request a transmission to a telephone or FAX, and proceeds to step SP15 to terminate the processing.

Contrary to this, if an affirmative result is returned at step SP5, this means that the displayed portion of the communication device and its telephone number has been clicked by the user, in which case the control unit 21 proceeds to step SP6.

At step SP6, the control unit 21 determines whether or not the device subjected to communication control, clicked by the user, is a FAX. If a negative result is returned here, this means that the device subjected to communication control clicked by the user is not a FAX but a telephone, in which case the control unit 21 proceeds to step SP8.

At step S8, the control unit 21 determines, upon placing a call, whether or not the country number of the country in which the user exists is coincident with the country number of the telephone number of the destination. If an affirmative result is returned here, this means that the country numbers are coincident, in which case the control unit 21 proceeds to step SP9, where the control unit 21 recognizes that the country number should be deleted upon placing a call, and proceeds to step SP10.

Contrary to this, if a negative result is returned at step SP8, this means that the country numbers are not coincident, in which case the control unit 21 recognizes that the country number should be first dialed, upon placing a call, and proceeds to step SP10.

At step SP10, the control unit 21 determines whether or not an area in which the user exist is coincident in toll number with the area of the telephone number of the destination. If an affirmative result is returned here, this means that the toll numbers are coincident, in which case the control unit 21 proceeds to step SP11, where the control unit 21 recognizes that the toll number should be deleted, and proceeds to step SP12.

Contrary to this, if a negative result is returned at step SP10, this means that the toll numbers are not coincident, in which case the control unit 21 recognizes that the toll number should be dialed upon placing a call, and proceeds to step SP12.

At step SP12, the control unit 21 determines whether or not the client computer apparatus 2 has an on-hook function. If a negative result is returned here, this means that the client computer apparatus 2 does not have an on-hook function, in which case the control unit 21 proceeds to step SP14.

Contrary to this, if an affirmative result is returned at step SP12, this means that the client computer apparatus 2 has the on-hook function, in which case the control unit 21 proceeds to step SP13 to prepare for placement of a call under on-hook control, and proceeds to step SP14.

At step SP14, the control unit 21 performs the transmission origination processing for the clicked telephone number to establish a communication link with the telephone 6, and proceeds to step SP15 to terminate the processing.

Turning back to step SP6, if an affirmative result is returned, this means that the device subjected to communication control clicked by the user is a FAX, in which case the control unit 21 proceeds to step SP7.

At step SP7, the control unit 21 starts FAX application software from the memory 21A to read a communication procedure for establishing a communication link with the FAX apparatus 7. After the user has inputted FAX information through the keyboard unit 2K, the control unit 21 executes the transmission processing and proceeds to step SP8.

Afterward, similar FAX transmission processing is performed in accordance with steps SP8–SP14 in the procedure for placing a telephone call, followed by the processing terminated at step SP15.

(4-2) Communication Control for Internet Telephone, Internet FAX, and Internet Voice Mail In this case, devices subjected to communication control are only changed from the telephone 6 and the FAX apparatus 7 to the Internet telephone, Internet FAX, or Internet voice mail by the computer apparatus 14 connected to a network through the Internet 10.

In this case, as shown in FIG. 7, an extended portion of tags presents <A HREF="internettelephone to: 01.23.45.67"> <B> Internet telephone:(01.23.45.67)</B> </A> <BR>, <A HREF="internetfaxto:01.23.45.67"> <B> Internet FAX:(01.23.45.67)</B> </A> <BR>, and <A HREF="internetvoicemaileto:taro@sony.co.jp"> <B> Internet voice mail:taro@sony.co.jp</B> </A> <BR>, as a source display of an HTML file. For reference, the addresses of the Internet telephone and FAX are IP addresses, and the address of an Internet voice mail is described as represented by a domain name.

Also, in this case, the client computer apparatus 2 has the communication control information previously registered in the memory 21A of the control unit 21 (FIG. 3) for controlling communications with the Internet telephone, Internet FAX or Internet voice mail, so that the address of the destination computer apparatus 14, with which a communication link may be established via the Internet telephone, Internet FAX or Internet voice mail, is individually displayed on the home page in a predetermined format (in red and bold). Thus, when a displayed portion of the address is clicked by the user, a communication link is established with the destination computer apparatus 14 via the Internet telephone, Internet FAX or Internet voice mail.

Actually, the client computer apparatus 2 analyzes an HTML file and displays a home page as illustrated in FIG. 8 on the screen. In this event, the client computer apparatus 2 displays characters of devices subjected to communication control and their addresses (Internet telephone: 01.23.45.67, Internet FAX: 01.23.45.67, Internet voice mail: taro@sony.co.jp) in red and bold in accordance with user notification information previously registered in the memory 21A, thereby facilitating the recognition by the user.

Consequently, when any of the display portions of the three types of devices subjected to communication control and their addresses, displayed in red and bold, is clicked by the user, the client computer apparatus 2 automatically performs the transmission origination processing by the control unit 21 to establish a communication link with the computer 14 of the destination.

Figure 9:
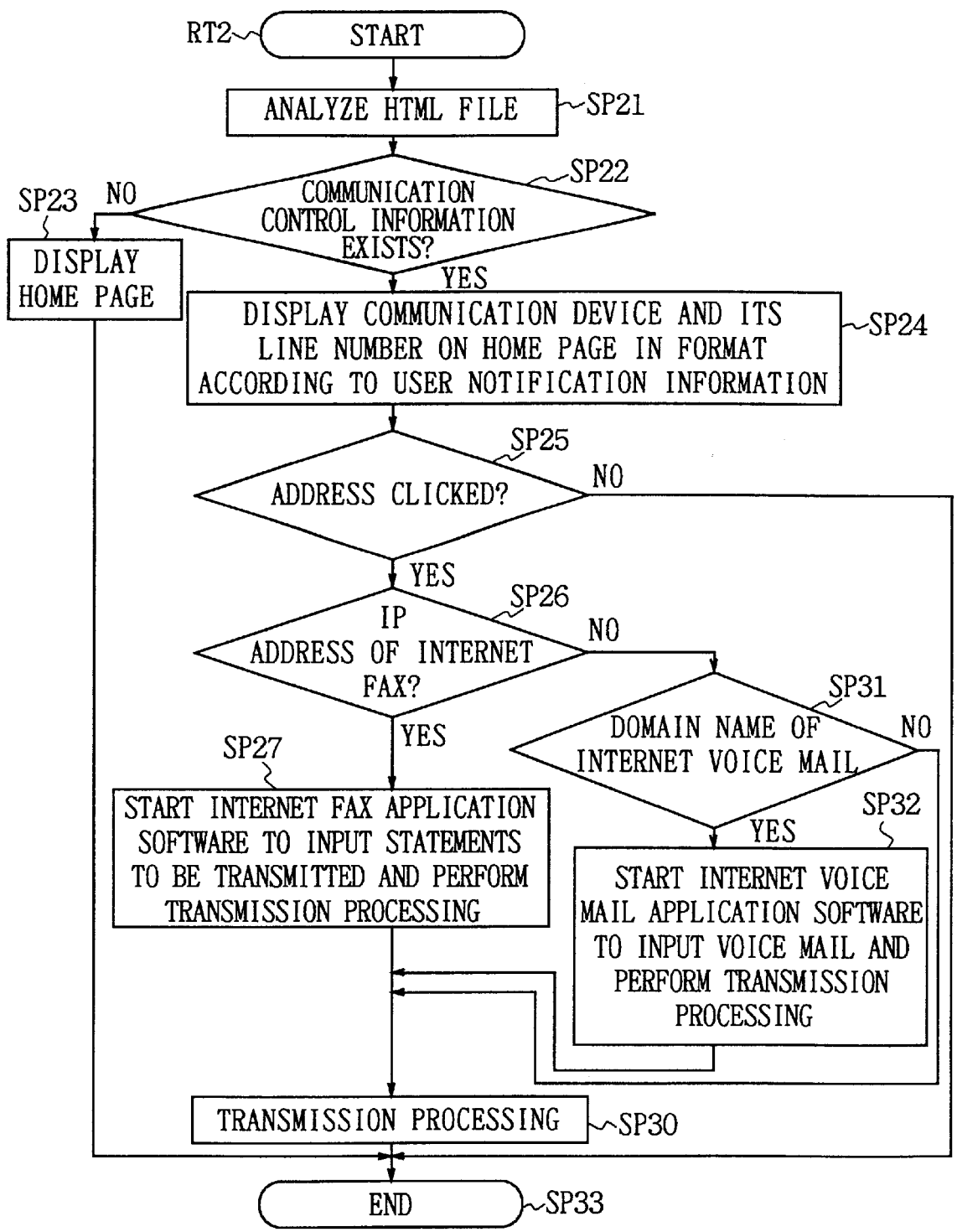
FIG. 9 is a flow chart illustrating a processing procedure for establishing a communication link through the Internet.

In the following, a processing procedure for establishing a communication link via the Internet telephone, Internet FAX, and Internet voice mail will be described with reference to a flow chart of FIG. 9. The client computer apparatus 2 first enters the processing procedure from a starting step RT2, and proceeds to step SP21.

At step SP21, the control unit 21 of the client computer apparatus 2 analyzes an HTML file transmitted thereto from the IP server 11, and proceeds to step SP22. At step SP22, the control unit 21 determines whether or not communication control information previously registered in the memory 21A exists in the analyzed HTML file.

If a negative result is returned here, this means that the communication control information does not exist in the HTML file, in which case the control unit 21 proceeds to step SP23. At step SP23, no communication control information exists in the HTML file, i.e., a transmission request can not be made by clicking manipulations, in which case the control unit 21 simply displays a home page on the screen, and proceeds to step SP33 to terminate the processing.

Contrary to this, if an affirmative result is returned at step SP22, this means that the communication control information exists in the HTML file, in which case the control unit 21 proceeds to step SP24. As step SP24, the control unit 21 displays devices subjected to communication control (Internet telephone, Internet FAX, Internet voice mail) and their addresses on the home page in a method according to user notification information (in red and bold) based on the detected communication control information, and then proceeds to step SP25.

At step SP25, the control unit 21 determines whether or not any of the three types of devices subjected to communication control and their addresses, displayed in red and bold on the home page, has been clicked by the user. If a negative result is returned here, this means that any of the addresses has not been clicked by the user, in which case the control unit 21 determines that the user has not issue a transmission request, and proceeds to step SP33 to terminate the processing.

Contrary to this, if an affirmative result is returned at step SP25, this means that any of the addresses has been clicked by the user, in which case the control unit 21 proceeds to step SP26.

At step SP26, the control unit 21 determines whether or not the clicked address is an IP address of the Internet FAX. If an affirmative result is returned here, this means that a communication control via the Internet FAX has been selected, in which case the control unit 21 proceeds to step SP27.

At step SP27, the control unit 21 starts application software for the Internet FAX. When the user has inputted transmission statements for FAX information, the control unit 21 executes the transmission processing, and proceeds to step SP30.

At step SP30, the control unit 21 performs the transmission origination processing for the IP address of the clicked Internet FAX, establishes a communication link with the computer apparatus 14 of the destination through the Internet FAX, and proceeds to step SP33 to terminate the processing.

Conversely, if a negative result is returned at step SP26, this means that the IP address of the Internet FAX is not selected, in which case the control unit 21 proceeds to step SP31.

At step SP31, the control unit 21 determines whether or not the domain name of the Internet voice mail has been selected. If an affirmative result is returned, this means that a communication control via the Internet voice mail has been selected by the user, in which case the control unit 21 proceeds to step SP32.

At step SP32, the control unit 21 starts application software for the Internet voice mail. As the user inputs a voice mail through the microphone 2M, the control unit 21 executes the transmission processing, and proceeds to step SP30. At step SP30 onward, the control unit 21 performs the transmission origination processing in accordance with the domain name of the Internet voice mail, as is the case of the Internet FAX, establishes a communication link with the computer apparatus 14 of the destination through the Internet voice mail, and proceeds to step SP33 to terminate the processing.

Conversely, if a negative result is returned at step SP31, this means that the IP address of the Internet telephone has been selected, rather than the IP address of the Internet FAX or the domain name of the Internet voice mail, in which case the control unit 21 proceeds to step SP30.

At step SP27 onward, the control unit 21 performs the transmission origination processing for the IP address of the Internet telephone, as is the case of the Internet FAX, establishes a communication link with the computer apparatus 14 of the destination through the Internet telephone, and proceeds to step SP33 to terminate the processing.

It should be noted that since a unique address is used to establish a communication link with the computer apparatus 14 of the destination in the case of the Internet telephone, Internet FAX, and Internet voice mail, it is not necessary to distinguish communication links in accordance with country numbers or toll numbers.

(4-3) Communication Control in Accordance with Communication Control Time and Priority In this case, a device subjected to communication control is the telephone 6, wherein clicking manipulations out of an available days-of-week range and an available time range will not permit a call to be placed to the telephone, with predetermined remarks being displayed instead. As illustrated in FIG. 10, an extended portion of tags presents, as a source display of an HTML file, <A HREF=from8:00to17:00+0900(JST)through Monday to Friday "telephoneto:00-1234-5678"> <B> Tel:00-1234-5678</B> </A> <BR>.

As an example of a displayed home page in this case, only a communication device and its telephone number are displayed in red and bold, as Tel:00-1234-5678, as illustrated in FIG. 11, such that a normal call is placed when this displayed portion is clicked.

However, since the client computer apparatus 2 has "from to" and "through to" as transmission control information previously registered in the memory 21A of the control unit 21 (FIG. 3), the client computer apparatus 2 does not place a call if the user clicks on a displayed portion at time of a day of weeks out of available ranges, but instead displays a remark saying "Now out of service time. Please call from 8:00 to 17:00 (local time in Japan) on Monday to Friday." in a window.

Also, FIG. 12 illustrates a source display of an HTML file when other devices subjected to communication control exist out of an available days-of-week range and an available time range, if the communication control time is defined. In this case, the client computer apparatus 2 may also perform a communication control in accordance with the priority when "others" is detected, so as to control a communication device corresponding to a specifying word described subsequent to "others", for example, FAX by starting FAX application software to conduct a FAX transmission.

As shown in FIG. 12, an extended portion of tags presents, as a source display of an HTML file, <A HREF= from8:00to17:00+0900(JST)through Monday to Friday "telephoneto:03-1234-5678", others"faxto:03-1234-1234"> <B> inquiries by telephone (8:00 to 17:00) (03-1234-5678) </B> </A> <BR> and <A HREF="faxto:03-1234-1234"> <B> FAX(03-1234-1234) out of service hours </B> </A> <BR>.

As an example of a displayed home page in this case, Inquiries by Telephone (8:00 to 17:00) (03-1234-5678) and FAX (03-1234-1234) out of service hours are displayed as illustrated in FIG. 13. If the displayed portion Inquiries by Telephone (8:00 to 17:00) (03-1234-5678) is clicked within an available days-of-week range and an available time range, a normal telephone call is placed. If the displayed portion FAX (03-1234-9012) out of service hours is clicked at time not satisfying the condition, the FAX application software is started to perform the processing associated with FAX transmission.

Figure 14:
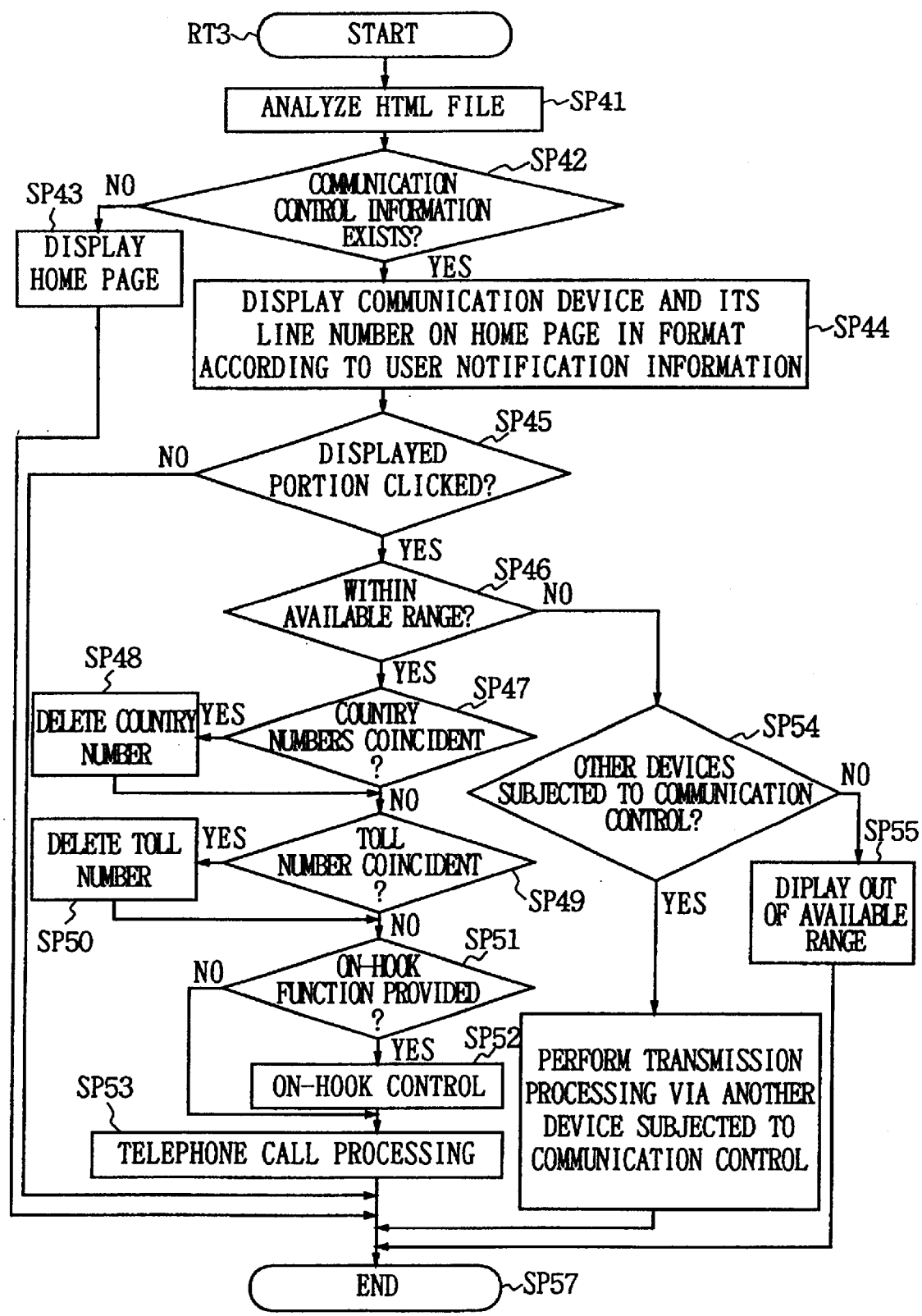
FIG. 14 is a flow chart illustrating a processing procedure for performing a communication control in accordance with a communication control time and priority.

A processing procedure for performing a communication control with a defined communication control time, as described above, as well as for performing a communication control in accordance with the priority will be described with reference to a flow chart illustrated in FIG. 14. The client computer apparatus 2 first enters the processing procedure from a starting step RT3, and proceeds to step SP41.

At step SP41, the control unit 21 of the client computer apparatus 2 analyzes an HTML file transmitted thereto from the IP server 11, and proceeds to step SP42. At step SP42, the control unit 21 determines whether or not communication control information previously registered in the memory 21A exists in the analyzed HTML file.

If a negative result is returned here, this means that the communication control information does not exist in the HTML file, in which case the control unit 21 proceeds to step SP43. At step SP43, since no communication control information exists in the HTML file, the control unit 21 simply displays a home page on the screen, and proceeds to step SP57 to terminate the processing.

Contrary to this, if an affirmative result is returned at step SP42, this means that the communication control information exists in the HTML file, in which case the control unit 21 proceeds to step SP44. As step SP44, the control unit 21 displays a communication device and its telephone number on the home page in a method according to user notification information (in red and bold) based on the detected communication control information, and then proceeds to step SP45.

At step SP45, the control unit 21 determines whether or not the display portion of the communication device and its telephone number displayed in red and bold on the home page has been clicked by the user. If a negative result is returned here, this means that the displayed portion of the communication device and its telephone number has not been clicked by the user, in which case the control unit 21 determines that the user has not issued a transmission request, and proceeds to step SP57 to terminate the processing.

Contrary to this, if an affirmative result is returned at step SP45, this means that the displayed portion of the communication device and its telephone number has been clicked by the user, in which case the control unit 21 proceeds to step SP46.

At step SP46, the control unit 21 determines whether or not the current day of the week and time, at which the displayed portion has been clicked, are within the available days-of-week range and the available time range. If an affirmative result is returned here, this means that the current day of the week and time falls under the transmission origination condition so that a call may be placed, in which case the control unit 21 proceeds to step SP47.

At step SP47, the control unit 21 determines, upon placing a call, whether or not the country number of the country in which the user exists is coincident with the country number of the telephone number of the communication device. If an affirmative result is returned here, this means that the country numbers are coincident, in which case the control unit 21 proceeds to step SP48, where the control unit 21 recognizes that the country number should be deleted upon placing a call, and proceeds to step SP49.

Contrary to this, if a negative result is returned at step SP47, this means that the country numbers are not coincident, in which case the control unit 21 recognizes that the country number should be first dialed upon placing a call, and proceeds to step SP49.

At step SP49, the control unit 21 determines whether or not an area in which the user exist is coincident in toll number with the area of the telephone number of the communication device. If an affirmative result is returned here, this means that the toll numbers are coincident, in which case the control unit 21 proceeds to step SP50, where the control unit 21 recognizes that the toll number should be deleted, and proceeds to step SP51.

Contrary to this, if a negative result is returned at step SP49, this means that the toll numbers are not coincident, in which case the control unit 21 recognizes that the toll number should be dialed upon placing a call, and proceeds to step SP51.

At step SP51, the control unit 21 determines whether or not the client computer apparatus 2 has an on-hook function. If a negative result is returned here, this means that the client computer apparatus 2 does not have an on-hook function, in which case the control unit 21 proceeds to step SP53.

Contrary to this, if an affirmative result is returned at step SP51, this means that the client computer apparatus 2 has the on-hook function, in which case the control unit 21 proceeds to step SP52 to prepare for placement of a call under on-hook control, and proceeds to step SP53.

At step SP53, the control unit 21 performs the transmission origination processing for the displayed telephone number to establish a communication link, and proceeds to step SP57 to terminate the processing.

Conversely, if a negative result is returned at step SP46, this means that the user has clicked out of the available range, i.e., not within the available days-of-week range and the available hour range, in which case the control unit 21 proceeds to step SP54.

At step SP54, the control unit 21 determines whether any other device subjected to communication control exists other than the telephone. If a negative result is returned here, this means that no other device under communication control exists other than the telephone, in which case the control unit 21 proceeds to step SP55 to display a remark "Now out of service time. Please call from 8:00 to 17:00 (local time in Japan) on Monday to Friday," and proceeds to step SP57 to terminate the processing.

Contrary to this, if an affirmative result is returned at step SP54, this means that other devices subjected to communication control exist other than the telephone, in which case the control unit 21 displays the other devices subjected to communication control and their line number. When a desired communication device (FAX, Internet telephone, Internet FAX, Internet voice mail, pager, or the like) is selected by the user, the control unit 21 performs the transmission origination processing for the selected communication device to establish a link therewith, and proceeds to step SP57 to terminate the processing.

(5) Operation and Effect

In the network system 1 configured as described above, a home page created based on communication control information (specifying word, associative information, user notification information, transmission control information, priority processing information) defined in both the IP server 11 and the client computer apparatus 2 is stored in the IP server 11.

Also, as the communication control information has been previously registered in the memory 21A by the user, the client computer apparatus 2 can analyze an HTML file transmitted thereto from the IP server 11 to detect the communication control information therefrom, thereby making it possible to display communication devices and their line numbers in red and bold on a home page, in accordance with the user notification information, so as to be readily recognizable by the user.

When the user, viewing this home page, attempts to access the creator of the home page through a desired communication device, the user clicks a displayed portion of the communication device and its line number displayed in red and bold. This causes the client computer apparatus 2 to perform the transmission origination processing to the line number of the clicked communication device to establish a link therewith.

In this event, since the user can control the communication with the communication device only by viewing the communication device and its line number displayed in red and bold and clicking on the displayed portion, it is possible to omit troublesome efforts such as again pushing the line number to place a call, transmitting FAX information, and so on, as before, as well as to readily and correctly establish a communication link without pushing an erroneous line number.

Also, since the client computer apparatus 2 can arbitrarily represent displayed portions of communication devices and their line numbers in color and type of font based on user notification information previously registered by the user, the displayed portions become visually significantly recognizable, thereby making it possible to improve the visibility and operability for the user.

Further, by previously registering transmission control information for a communication device, the client computer apparatus 2 need not execute useless transmission origination processing, possibly caused by clicking manipulations out of an available days-of-week range and an available hour range, thereby preventing the user from being displeased that no body responds to ringer sound. In this event, the client computer apparatus 2 can perform a communication control based on the transmission control information by simultaneously displaying an available days-of-week range and an available hour range, in which the transmission origination processing can be performed, or by accepting a request for transmission by another communication device.

According to the foregoing configuration, the client computer apparatus 2 has previously registered the memory 21A with communication control information defined in both the IP server 11 and the client computer apparatus 2, and receives and analyzes an HTML file transmitted thereto from the IP server 11. When the communication control information is detected in the HTML file, the client computer apparatus 2 displays a communication device and its line number in a predetermined format based on user notification information within the communication control information. When a displayed portion of the communication device and its line number is clicked, the client computer apparatus 2 establishes a communication link with the selected communication device based on the transmission control information, thereby making it possible to highly operably control the communication device displayed on a home page in accordance with the contents of the communication control information registered by the user himself.

(6) Other Embodiments

While the foregoing embodiment has been described for the case where a communication link is established when a displayed portion of a line number of a communication device is clicked on a home page displayed in accordance with an HTML file as a text file, the present invention is not limited to this. Alternatively, a telephone call or a facsimile transmission can be originated when a clicking is made on a telephone control icon 51 or a FAX control icon 52 (FIG. 15) displayed on a home page based on icon adding information registered as user notification information.

Figure 16:
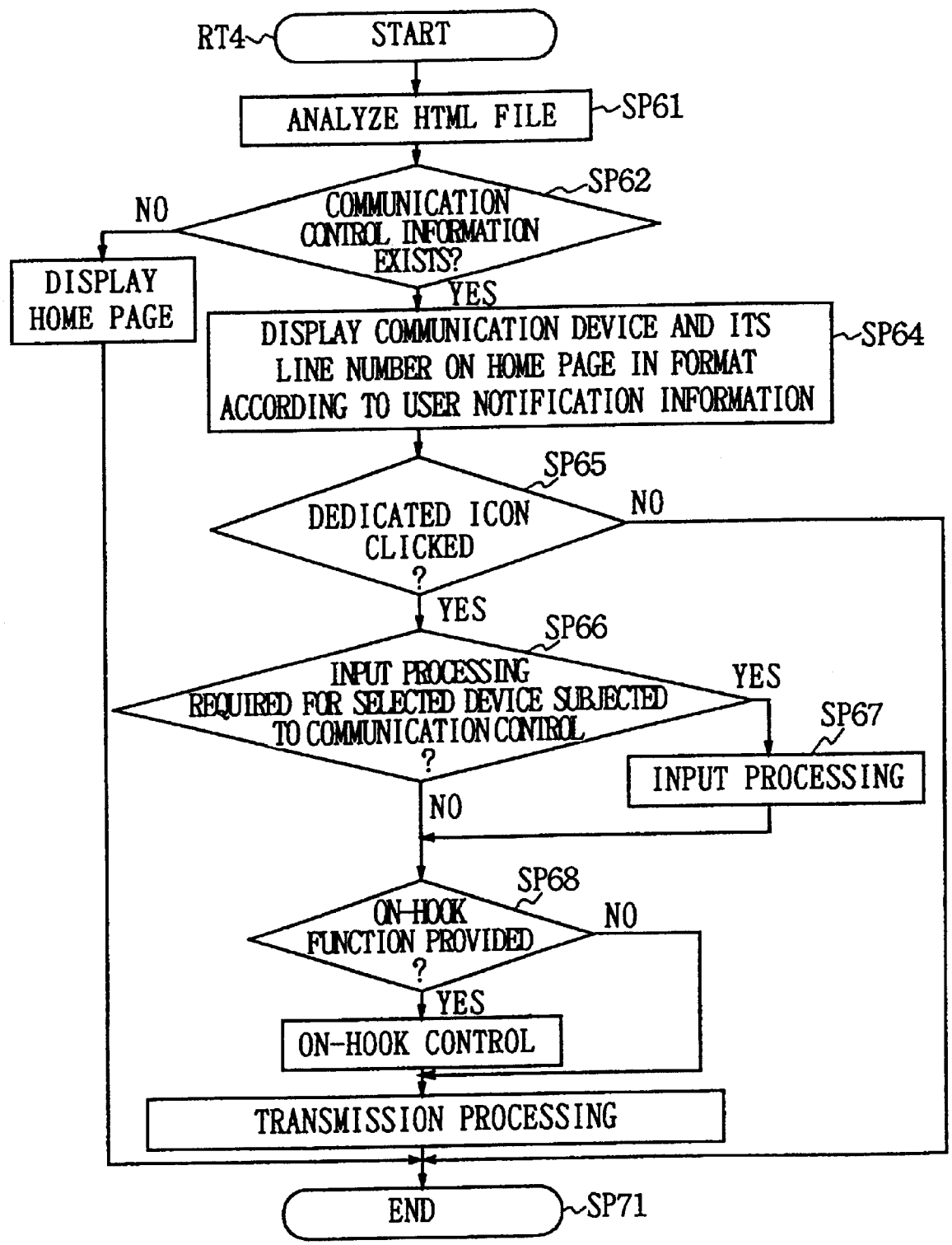
FIG. 16 is a flow chart illustrating a communication control processing procedure using dedicated icons.

In this case, a communication control processing procedure using dedicated icons enters from a starting step RT4 and proceeds to step SP61, as illustrated in FIG. 16. At step SP61, the control unit 21 of the client computer apparatus 2 analyzes an HTML file transmitted thereto from the IP server 11, and proceeds to step SP62.

At step SP62, the control unit 21 determines whether or not communication control information previously registered in the memory 21A exists in the analyzed HTML file. If a negative result is returned here, this means that the communication control information does not exist in the HTML file, in which case the control unit 21 simply displays a home page on the screen, and proceeds to step SP71 to terminate the processing because the communication control information does not exist.

Contrary to this, if an affirmative result is returned at step SP62, this means that the communication control information exists in the HTML file, in which case the control unit 21 proceeds to step SP64. At step SP64, the control unit 21 displays dedicated icons representative of devices subjected to communication control in a predetermined format based on user notification information within the detected communication control information, and proceeds to step SP65.

At step SP65, the control unit 21 determines whether or not any dedicated icon has been clicked by the user. If a negative result is returned here, this means that any dedicated icon has not been clicked by the user, in which case the control unit 21 determines that no request for a link has been made from the user, and proceeds to step SP71 to terminate the processing.

Contrary to this, if an affirmative result is returned at step SP65, this means that any of the dedicated icons representative of devices subjected to communication control has been clicked by the user, in which case the control unit 21 proceeds to step SP66. At step SP66, the control unit 21 determines whether or not information must be inputted for transmission to the selected device subjected to communication control.

If a negative result is returned here, this means that no information need be inputted for transmission, i.e., a telephone has been selected as the device subjected to communication control, in which case the control unit 21 proceeds to step SP68. Contrary to this, if an affirmative result is returned at step SP66, this means that information need be inputted for transmission, i.e., FAX, pager, Electronic mail or Internet voice mail has been selected, in which case the control unit 21 proceeds to step SP67, where information to be transmitted is inputted, and then proceeds to step SP68.

For the processing at step SP68 onward, on-hook processing is selected, and the transmission origination processing is executed for the clicked device subjected to communication control to establish a communication link. Then, the control unit 21 proceeds to step SP71 to terminate the processing.

Figure 17:
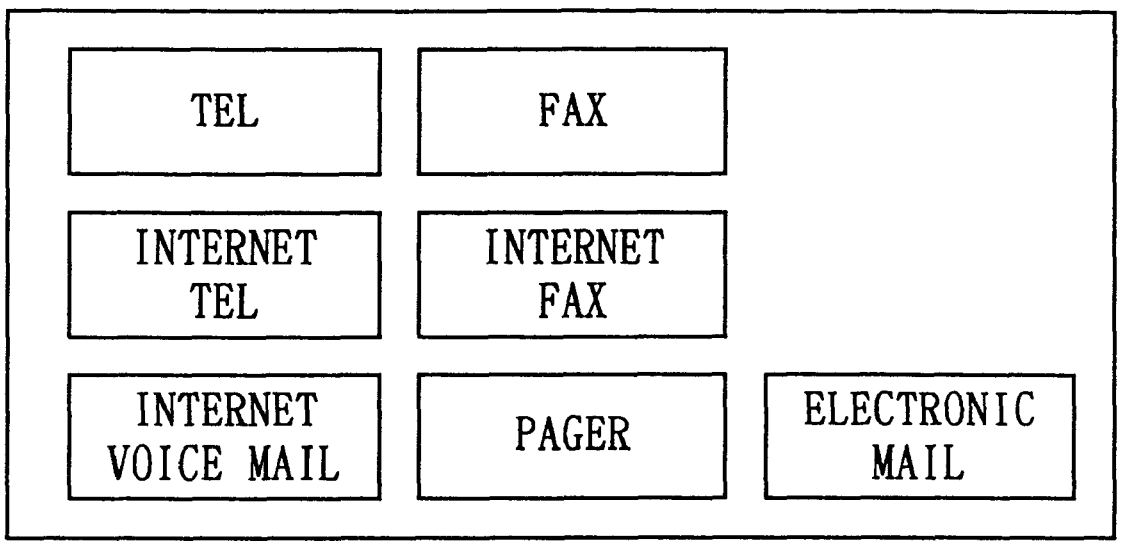
FIG. 17 is a schematic diagram illustrating a home page displayed by a browser using a pull-down menu.

Also, while the foregoing embodiment has been described for the case where a communication link is established when a clicking is made on a display portion of a communication device and its line number displayed on a home page, the present invention is not limited to this. Alternatively, a menu illustrated in FIG. 17, for example, can be opened in the form of icons to display all devices subjected to communication control, for which the communication control can be provided, such that a communication link may be established with a communication device corresponding to an icon selected therefrom. In this case, since the user can select any of devices subjected to communication control on the menu, the user does not have to look for a displayed portion of a communication device and its line number on a home page, thereby improving the operability.

Further, while the foregoing embodiment has been described for the case where the communication control information made up of a specifying word, associative information, user notification information, transmission control information, and priority processing information has been previously registered in a memory as shown in the example of FIG. 3, the present invention is not limited to this. Alternatively, any communication control information described in a variety of other characters, numbers, and so on can be used, as long as it is a common communication control information defined in both a server and a client.

Further, while the foregoing embodiment has been described for the case where communication devices such as the telephone 6, the FAX apparatus 7, the pager 8, the computer apparatus 14, and so on can be controlled for communications, as devices subjected to communication control, the present invention is not limited to this. Alternatively, a variety of other communication devices such as a portable telephone and so on can be extended using specifying words so that communications with such devices are controlled, as long as the client computer apparatus 2 has a function of controlling external devices.

Further, while the foregoing embodiment has been described for the case where a communication link between the client computer apparatus 2 and a communication device, which is subjected to communication control, is established using the ISDN line 3, the present invention is not limited to this, and a communication link can be established using any other communication medium such as radio communication or the like.

Further, while the foregoing embodiment has been described for the case where a communication device is controlled using a home page in WWW, the present invention is not limited to this. Alternatively, a communication device can be controlled on a screen of an electronic mail for communicating between a client and a client. Moreover, a communication device can be controlled by data transfer through a recording media such as CD-ROM.

Further, while the foregoing embodiment has been described for the case where communication control information has been registered in the client computer apparatus 2, the present invention is not limited to this, and communication control information can be alternatively registered in a communication terminal such as a portable telephone or the like. In this case, the processing involved in placing a call to a telephone number read from a memory of the portable telephone can be controlled by the portable telephone based on transmission control information in terms of days of week and hours.

Further, while the foregoing embodiment has been described for the case where the client computer apparatus 2 as a communication terminal apparatus comprises the ISDN interface unit 26 as receiving means; the control unit 21 and the display unit 25 as display means; the control unit 21 as control means; and the memory 21A as storage means, the present invention is not limited to this. Alternatively, the client computer apparatus 2 can comprise a variety of other receiving means, display means, control means, and storage means.

According to the present invention as described above, when communication control information is detected in a text file transmitted from a server, a communication device corresponded to a specifying word and its line number are displayed, and transmission origination processing can be performed in accordance with a transmission origination condition defined by transmission control information when a displayed portion of the communication device and its line number is selected, so that a communication with the selected communication device can be controlled based on the transmission control information, thereby making it possible to realize a communication terminal apparatus which is capable of controlling a communication device with a good operability.

Also, according to the present invention, when a text file transmitted from a server is received, and communication control information is detected in the text file, a communication device corresponded to a specifying word and its line number are displayed. When a displayed portion of the communication device and its line number is selected, transmission origination processing can be performed in accordance with a transmission origination condition defined by transmission control information, so that a communication with the selected communication device can be controlled based on the transmission control information, thereby making it possible to realize a communication control method which is capable of controlling a communication device with a good operability.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A communication terminal apparatus comprising:
   receiving means for receiving communication control information including one or more specifying indicators, each indicator specifying a predetermined communication device with which a communication link is to be established, and for receiving transmission control information for controlling transmission origination processing between said communication terminal apparatus and each of said predetermined communication devices said transmission control information for establishing a communication link between said communication terminal apparatus and one of said predetermined communication devices upon the selection of said one of said predetermined communication devices; and control means operative, in response to, and at a time of selection of said specifying indicator by operation of a user at said communication terminal apparatus, to perform transmission origination processing at said one of said communication devices in accordance with said associated transmission control information to establish a communication link between said communication terminal apparatus and said one of said communication devices when a predetermined transmission origination condition defined by said transmission control information is satisfied at the time of selection of said specifying indicator, and to interrupt said transmission origination processing when said predetermined origination condition is not satisfied at the time of selection of said specifying indicator.

2. The communication terminal apparatus of claim 1, wherein said transmission control information designates a predetermined range of days of the week and a predetermined range of hours of the day, said control means performing said transmission origination processing upon, and at the time of selection of said specifying indicator only when said day of the week and hour of the day at the time of selection of said specifying indicator is within said predetermined range of days of the week and predetermined range of hours of the day, and thus said transmission origination condition is satisfied.

3. The communication terminal apparatus of claim 1, wherein said communication control information includes user notification information for specifying a display state for displaying each of said specifying indicators.

4. The communication terminal apparatus of claim 1, wherein said communication control information includes icon information for displaying a dedicated icon corresponding to said predetermined communication devices and a menu screen including a plurality of dedicated icons, each corresponding to one of said predetermined available communication devices.

5. The communication terminal apparatus of claim 1, wherein said control means performs said transmission origination processing at a facsimile device with which a communication link is to be established.

6. The communication terminal apparatus of claim 1, wherein said control means performs said transmission origination processing at a telephone device with which a communication link is to be established.

7. The communication terminal apparatus of claim 1, wherein said control means performs said transmission origination processing at a computer device with which a communication link is to be established.

8. A communication control method, comprising the steps of:

transmitting communication control information including at least one or more specifying indicators, each indicator specifying a predetermined communication device with which a communication link is to be established; and transmitting transmission control information for controlling transmission origination processing between a communication terminal apparatus and each of said predetermined communication devices said transmission control information for establishing a communication link between said communication terminal apparatus and one of said predetermined communication devices upon the selection of said one of said predetermined communication devices;

receiving said communication control information at said communication terminal apparatus;

detecting said communication control information;

displaying on a screen of said communication terminal apparatus at lest one character or diagram corresponding to each of said specifying indicators; and performing said transmission origination processing at said one of said communication devices in response to, and at a time of selection of one of said at least one characters or diagrams by operation of a user corresponding to said one of said specifying indicators to establish a communication link with said one of said communication devices in accordance with said associated transmission control information when a predetermined transmission origination condition defined by said transmission control information is satisfied at the time of selection of said specifying indicator, and to interrupt said transmission origination processing when said predetermined transmission origination condition is not satisfied at the time of selection of said specifying indicator.

9. The communication control method of claim 8, wherein said transmission control information designates a predetermined range of days of the week and a predetermined range of hours of the day, said control means performing said transmission origination processing upon, and at the time of selection of said specifying indicator and when said day of the week and hour of the day at the time of selection of said specifying indicator is within said predetermined range of days of the week and predetermined range of hours of the day, and thus said transmission origination condition is satisfied only when said day of the week and hour of the day is within said predetermined range of days of the week and predetermined range of hours of the day, and thus said transmission origination condition is satisfied.

10. The communication control method of claim 8, wherein said communication control information includes user notification information for specifying a display state for displaying said each of said specifying indicators, and said character or diagram is displayed in accordance with said specified display state.

11. The communication control method of claim 8, wherein said communication control information includes icon information for displaying a dedicated icon corresponding to said one of said predetermined communication devices and a menu screen including a plurality of such dedicated icons, each corresponding to one of said predetermined available communication devices.

12. The communication control method of claim 8, further comprising the step of performing said transmission origination processing at a facsimile device with which a communication link is to be established.

13. The communication control method of claim 8, further comprising the step of performing said transmission origination processing at a telephone device with which a communication link is to be established.

14. The communication control method of claim 8, further comprising the step of performing said transmission origination processing at a computer device with which a communication link is to be established.

* * * * *